Patented Oct. 29, 1935

2,018,775

UNITED STATES PATENT OFFICE 2,018,775

PROCESS OF PREPARING DIPHENYL-METHANE DERIVATIVES

Berthold Bienert, Leverkusen-I. G. Werk, and Robert Held, Leverkusen-Wiesdorf, Germany, assignors to General Aniline Works, Inc., New York, N. Y., a corporation of Delaware No Drawing. Application June 1, 1934, Serial No. 728,625. In Germany June 9, 1933

4 Claims. (Cl. 260—64)

The present invention relates to diphenylmethane derivatives and to a process of preparing the same. We have found that 2',5'-dihalogen - 4' - alkyl-diphenylmethane - 2 - carboxylic acids of the formula:—

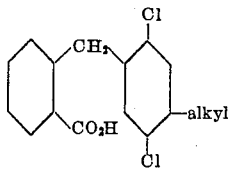

are obtained in a simple manner and in an excellent yield by causing halogens, such as chlorine or bromine, to react upon 4'-alkyl-diphenylmethane-2-carboxylic acids in the presence of inert organic solvents and of halogenation catalysts, such as iodine, phosphorus, sulfur and iron. Depending on the starting materials employed and on the conditions of working the reaction can be performed at ordinary or higher temperature. It is to be understood that instead of halogens, such as chlorine, there can be used agents yielding halogen under the conditions of working, such as sulfuryl chloride and the like, and it is pointed out that the latter compounds are intended to fall within the scope of the term "halogens" referred to in the appended claims as obvious chemical equivalents thereof. Various substituents may be present in the benzene nuclei and it is pointed out that in the first line such substituents are intended which are usually present in anthraquinone derivatives, such as alkyls, halogens, alkoxy groups, amino groups, sulfonic acid groups and the like, care being taken, however, that the 2'-, 5'- and 6'-positions are not substituted.

The dihalogen diphenylmethane-carboxylic acids thus obtained are valuable intermediate products for the preparation of dyestuffs as the 1,4-dihalogen-anthraquinone-2-carboxylic acids obtainable therefrom could not be prepared in any other economical manner up to the present time.

The following examples will illustrate the invention, without, however, restricting it thereto, the parts being by weight:—

*Example 1*

1 part of 4'-methyldiphenylmethane-2-carboxylic acid is suspended in 4 parts of trichlorobenzene, while adding 2 per cent. of iodine thereto, and gaseous chlorine is introduced at 20-30° C. until 2 halogen atoms have entered the molecule and a test portion taken shows a melting point of about 130° C. When the reaction is finished the dihalogenated acid crystallizes out for the most part. After some hours' standing it is sucked off and recrystallized from benzene. The 2',5'-dichloro-4'-methyl-diphenylmethane-2-carboxylic acid is obtained in a yield of about 60-65 per cent. and represents colorless crystals of the melting point of 135-136° C.

The 4'-methyl-diphenylmethane-2-carboxylic acid used as starting material can be obtained in a known manner by reducing 1 part of 4'-methyl-benzophenone-2-carboxylic acid with 1 part of zinc dust at 115-120° C. in the presence of 5 parts of water and 5 parts of concentrated ammonia.

Instead of trichlorobenzene there can be used other inert solvents, such as glacial acetic acid, nitrobenzene, carbon tetrachloride and the like. Furthermore, chlorine can be replaced by agents yielding chlorine under the conditions of working, such as sulfuryl chloride, care being taken however, that the temperature is sufficiently low to prevent anthrone ring closure.

Instead of 4'-methyl-diphenylmethane-2-carboxylic acid there can be used in the same manner and while observing the same conditions of working a corresponding monohalogenated 4'-methyl-diphenylmethane-2-carboxylic acid, such as the 3'-chloro- or -bromo-4'-methyl-diphenylmethane-2-carboxylic acids or the 3,6-dichloro-4'-methyl-diphenylmethane-2-carboxylic acid.

*Example 2*

20 parts of 4'-methyl-diphenylmethane-2-carboxylic acid are disolved in 40 parts of glacial acetic acid while adding 0.2 part of iodine thereto. A solution of 90 parts of bromine in 180 parts of glacial acetic acid is slowly added thereto at ordinary temperature and the whole is then heated to 60° C. for 4-5 hours. Upon cooling, the precipitated 2',5'-dibromo-4'-methyl-diphenylmethane-2-carboxylic acid is sucked off and washed with ligroine. For further purification the crude acid can be dissolved in diluted caustic soda lye with the addition of a small amount of a bisulfite solution and precipitated therefrom by the addition of hydrochloric acid to the boiling solution. It shows a melting point of 163-165° C.

*Example 3*

1 part of 4'-ethyl-diphenylmethane-2-carboxylic acid is dissolved in 4 parts of trichlorobenzene with the addition of 0.01 part of iodine and chlorine is introduced at 20-25° C. until a test portion taken shows a melting point of 155–160° C. and a chlorine content of about 22 per cent. The trichlorobenzene is removed by blowing steam into the solution and the residue is recrystallized from 2 parts of chlorobenzene. The 2',5'-dichloro-4'-ethyl-diphenylmethane-2-carboxylic acid shows a melting point of 177–180° C. and is obtained in a yield of about 75 per cent. It is pointed out that instead of the 4'-ethyl-compound there can be used in the same manner the corresponding 4'-isopropyl- or 4'-butyl-diphenylmethane-2-carboxylic acid.

We claim:—

1. The process which comprises causing a halogen to react upon a 4'-alkyl-diphenylmethane-2-carboxylic acid which has the 2'-, 5'- and 6'-positions unsubstituted in the presence of an inert solvent and of a halogenation catalyst, until 2 halogen atoms have entered the molecule.

2. The process which comprises causing chlorine to react upon a 4'-alkyl-diphenylmethane-2-carboxylic acid which has the 2'-, 5'- and 6'-positions unsubstituted in the presence of an inert solvent and of a small amount of iodine, which serves as a halogenation catalyst, until 2 chlorine atoms have entered the molecule.

3. The process which comprises causing a halogen to react upon 4'-methyl-diphenylmethane-2-carboxylic acid in the presence of an inert solvent and of a halogenation catalyst, until 2 halogen atoms have entered the molecule.

4. The process which comprises causing chlorine to react upon 4'-methyl-diphenylmethane-2-carboxylic acid in the presence of an inert solvent and of a small amount of iodine, until 2 chlorine atoms have entered the molecule.

BERTHOLD BIENERT.
ROBERT HELD.